(12) United States Patent
Brennan et al.

(10) Patent No.: US 12,405,888 B2
(45) Date of Patent: *Sep. 2, 2025

(54) DYNAMIC PERFORMANCE ADJUSTMENT

(71) Applicant: Advanced Micro Devices, Inc., Santa Clara, CA (US)

(72) Inventors: Christopher J. Brennan, Boxborough, MA (US); Akshay Lahiry, Boxborough, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/477,351

(22) Filed: Sep. 28, 2023

(65) Prior Publication Data

US 2024/0037031 A1 Feb. 1, 2024

Related U.S. Application Data

(63) Continuation-in-part of application No. 17/850,905, filed on Jun. 27, 2022, now Pat. No. 11,860,784.

(51) Int. Cl.
*G06F 12/00* (2006.01)
*G06F 12/06* (2006.01)
*G06F 12/121* (2016.01)

(52) U.S. Cl.
CPC ........ *G06F 12/0646* (2013.01); *G06F 12/121* (2013.01)

(58) Field of Classification Search
CPC .................. G06F 12/0802; G06F 2212/60
See application file for complete search history.

(56) References Cited

U.S. PATENT DOCUMENTS

| | | | | |
|---|---|---|---|---|
| 5,452,440 A * | 9/1995 | Salsburg | ............. | G06F 11/3447 714/E11.197 |
| 5,579,473 A * | 11/1996 | Schlapp | .................. | G09G 5/39 711/119 |
| 6,477,314 B1 * | 11/2002 | Tai | ........................ | H04N 5/9205 348/E5.053 |
| 10,049,427 B1 * | 8/2018 | Lachowsky | ............ | H04N 19/91 |
| 10,339,051 B2 * | 7/2019 | Stultz | .................. | G06F 12/0646 |
| 10,642,764 B1 * | 5/2020 | Gerhart | .................... | G06F 12/10 |
| 2003/0112366 A1 * | 6/2003 | Baylon | ................ | H04N 19/503 375/E7.184 |
| 2004/0139356 A1 * | 7/2004 | Ma | ........................ | G06F 1/3215 713/300 |
| 2008/0229076 A1 * | 9/2008 | Gonion | .................... | G06F 8/443 712/E9.034 |
| 2009/0094431 A1 * | 4/2009 | Sarkar | ................. | G06F 12/1458 711/163 |
| 2009/0138670 A1 * | 5/2009 | Mutlu | ................. | G06F 13/1663 711/E12.001 |
| 2013/0332681 A1 | 12/2013 | Miller et al. | | |

(Continued)

FOREIGN PATENT DOCUMENTS

EP 1031919 B1 8/2000

*Primary Examiner* — Tim T Vo
*Assistant Examiner* — Mohammad S Hasan
(74) *Attorney, Agent, or Firm* — Volpe Koenig

(57) ABSTRACT

A technique for operating a device is disclosed. The technique includes recording log data for the device; analyzing the log data to determine one or more performance settings adjustments to apply to the device; and applying the one or more performance settings adjustments to the device.

20 Claims, 6 Drawing Sheets

(56) References Cited

U.S. PATENT DOCUMENTS

| | | | |
|---|---|---|---|
| 2014/0149653 A1* | 5/2014 | Udipi | G06F 12/08 |
| | | | 711/202 |
| 2015/0095472 A1* | 4/2015 | Cardona | G06F 9/505 |
| | | | 709/221 |
| 2015/0139500 A1* | 5/2015 | Gerster | H04N 19/46 |
| | | | 382/104 |
| 2015/0146648 A1 | 5/2015 | Viger et al. | |
| 2016/0283393 A1* | 9/2016 | Kawaba | G06F 12/0893 |
| 2017/0024568 A1* | 1/2017 | Pappachan | G06F 21/64 |
| 2017/0271031 A1* | 9/2017 | Sharon | G11C 29/52 |
| 2018/0359410 A1* | 12/2018 | Ain-Kedem | G06T 1/20 |
| 2019/0050160 A1* | 2/2019 | Dardis | G06F 3/0673 |
| 2019/0146716 A1 | 5/2019 | Yang et al. | |
| 2019/0172496 A1* | 6/2019 | Lodato | G11B 27/036 |
| 2019/0206023 A1 | 7/2019 | Dimitrov et al. | |
| 2019/0361808 A1* | 11/2019 | Subramanian | G06F 12/0802 |
| 2021/0073126 A1* | 3/2021 | Moyer | G06F 12/0802 |
| 2021/0240631 A1* | 8/2021 | Joo | G06F 12/0811 |
| 2022/0075657 A1* | 3/2022 | Shimada | G06F 11/3409 |
| 2022/0164299 A1* | 5/2022 | Moshe | G06F 21/44 |
| 2022/0269603 A1* | 8/2022 | Ravimohan | G06F 12/0261 |
| 2022/0374154 A1* | 11/2022 | Campbell | G06F 3/0622 |
| 2022/0374367 A1* | 11/2022 | Fang | G06F 9/30043 |
| 2023/0094834 A1* | 3/2023 | Leng | H04N 21/2404 |
| | | | 348/180 |
| 2023/0096814 A1* | 3/2023 | Moyer | G06F 12/123 |
| | | | 711/133 |
| 2023/0102891 A1* | 3/2023 | Moyer | G06F 12/127 |
| | | | 711/118 |

* cited by examiner

DYNAMIC PERFORMANCE ADJUSTMENT

CROSS REFERENCE TO RELATED APPLICATIONS

This application is a continuation-in-part of U.S. patent application Ser. No. 17/850,905, filed on Jun. 27, 2022, which is incorporated by reference as if fully set forth herein.

BACKGROUND

Varying operational settings of a computer device can have great impact on performance. Techniques for automatically varying such settings are constantly being developed.

BRIEF DESCRIPTION OF THE DRAWINGS

A more detailed understanding can be had from the following description, given by way of example in conjunction with the accompanying drawings wherein.

DETAILED DESCRIPTION

A technique for operating a device is disclosed. The technique includes recording log data for the device; analyzing the log data to determine one or more performance settings adjustments to apply to the device; and applying the one or more performance settings adjustments to the device.

Figure 1:
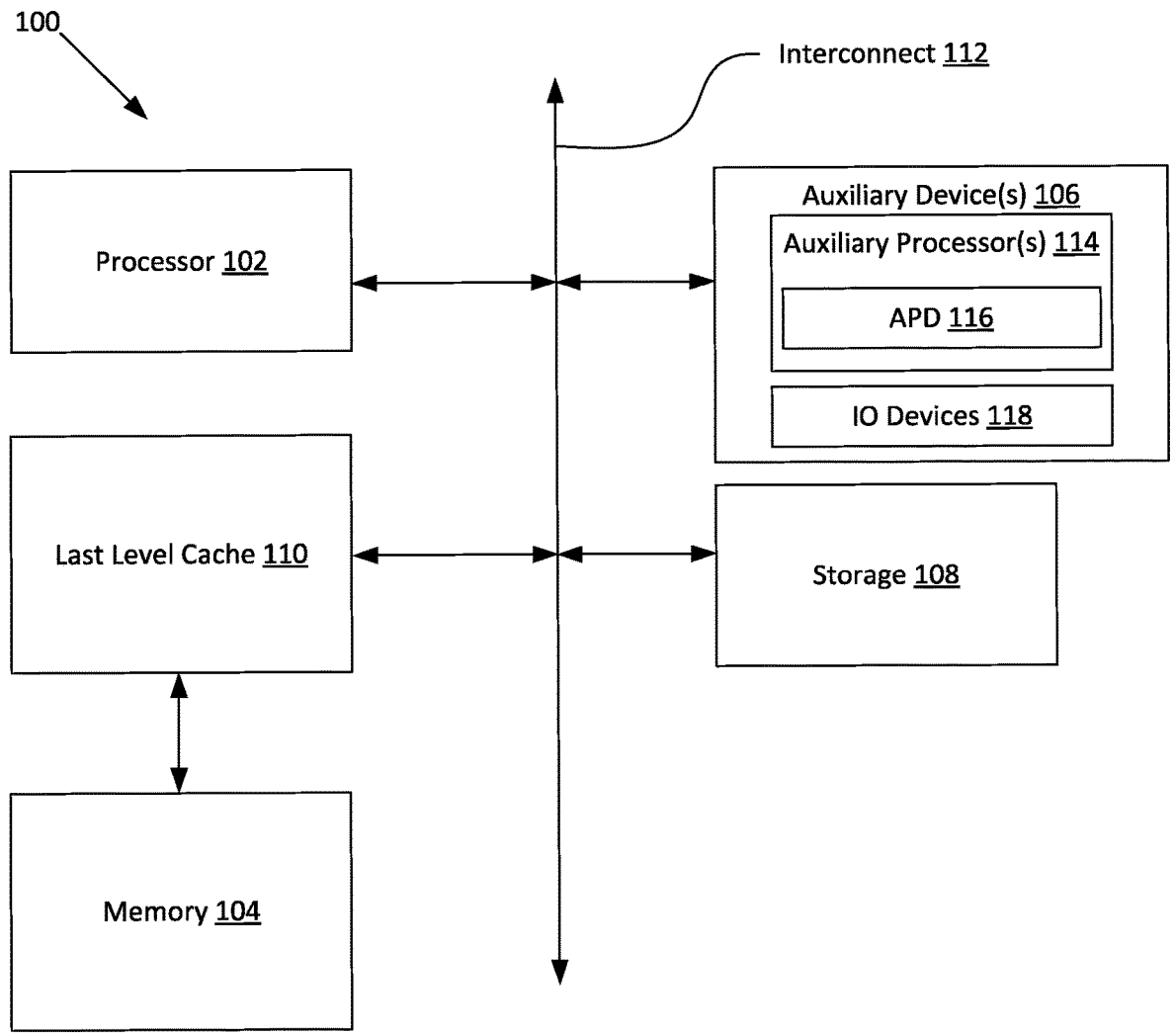
FIG. 1 is a block diagram of an example computing device in which one or more features of the disclosure can be implemented.

FIG. 1 is a block diagram of an example computing device 100 in which one or more features of the disclosure can be implemented. In various examples, the computing device 100 is one of, but is not limited to, for example, a computer, a gaming device, a handheld device, a set-top box, a television, a mobile phone, a tablet computer, or other computing device. The device 100 includes, without limitation, one or more processors 102, a memory 104, one or more auxiliary devices 106, a storage 108, and a last level cache ("LLC") 110. In some examples, the last level cache 110 is not included. An interconnect 112, which can be a bus, a combination of buses, and/or any other communication component, communicatively links the one or more processors 102, the memory 104, the one or more auxiliary devices 106, the storage 108, and the last level cache 110.

In various alternatives, the one or more processors 102 include a central processing unit (CPU), a graphics processing unit (GPU), a CPU and GPU located on the same die, or one or more processor cores, wherein each processor core can be a CPU, a GPU, or a neural processor. In various alternatives, at least part of the memory 104 is located on the same die as one or more of the one or more processors 102, such as on the same chip or in an interposer arrangement, and/or at least part of the memory 104 is located separately from the one or more processors 102. The memory 104 includes a volatile or non-volatile memory, for example, random access memory (RAM), dynamic RAM, or a cache.

The storage 108 includes a fixed or removable storage, for example, without limitation, a hard disk drive, a solid state drive, an optical disk, or a flash drive. The one or more auxiliary devices 106 include, without limitation, one or more auxiliary processors 114, and/or one or more input/output ("IO") devices. The auxiliary processors 114 include, without limitation, a processing unit capable of executing instructions, such as a central processing unit, graphics processing unit, parallel processing unit capable of performing compute shader operations in a single-instruction-multiple-data form, multimedia accelerators such as video encoding or decoding accelerators, or any other processor. Any auxiliary processor 114 is implementable as a programmable processor that executes instructions, a fixed function processor that processes data according to fixed hardware circuitry, a combination thereof, or any other type of processor. In some examples, the auxiliary processor(s) 114 include an accelerated processing device ("APD") 116.

The one or more IO devices 118 include one or more input devices, such as a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals), and/or one or more output devices such as a display, a speaker, a printer, a haptic feedback device, one or more lights, an antenna, or a network connection (e.g., a wireless local area network card for transmission and/or reception of wireless IEEE 802 signals).

The last level cache 110 acts as a shared cache for the various components of the device 100, such as the processor 102, the APD 116, and the various auxiliary devices 106. In some implementations, there other caches within the device 100. For example, in some examples, the processor 102 includes a cache hierarchy including different levels such as levels 1 and 2. In some examples, each such cache level is specific to a particular logical division of the processor 102, such as a processor core, or a processor chip, die, or package. In some examples, the hierarchy includes other types of caches as well. In various examples, one or more of the auxiliary devices 106 includes one or more caches.

In some examples, the last level cache 110 is "last level" in the sense that such a cache is the last cache that the device 100 attempts to service a memory access request from before servicing that request from the memory 104 itself. For example, if a processor 102 accesses data that is not stored in any of the cache levels of the processor 102, then the processor exports the memory access request to be satisfied by the last level cache 110. The last level cache 110 determines whether the requested data is stored in the last level cache 110. If the data is within the last level cache 110, the last level cache 110 services the request by providing the requested data from the last level cache 110. If the data is not within the last level cache 110, the device 100 services the request from the memory 104. As can be seen, in some implementations, the last level cache 110 acts as a final cache level before the memory 104, which helps to reduce the overall amount of memory access latency for accesses to the memory 104. Although techniques are described herein for operations involving the last level cache 110, it should be understood that the techniques can alternatively be used in other types of caches or memories.

Figure 2:
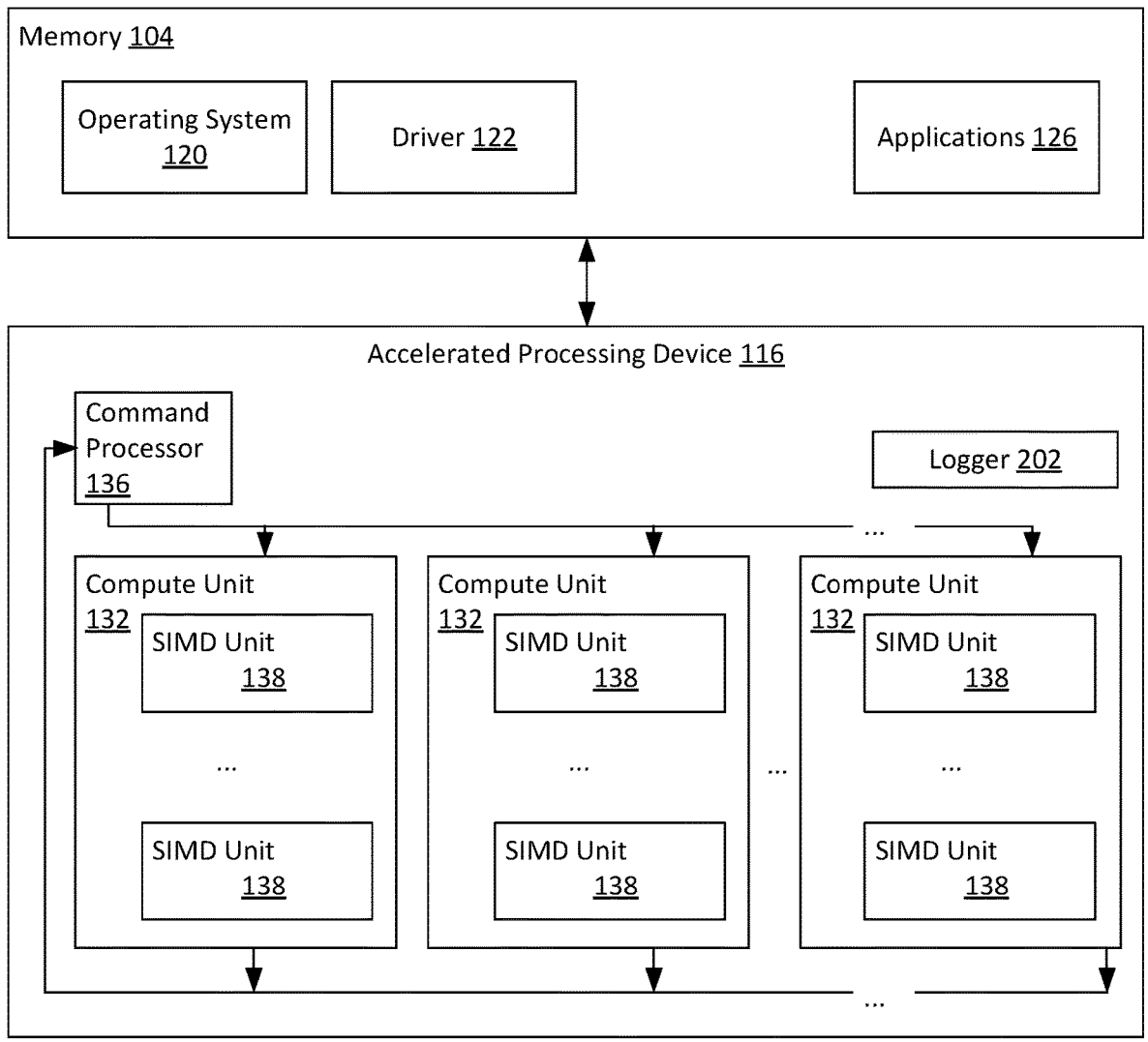
FIG. 2 is a block diagram of the device, illustrating additional details related to execution of processing tasks on the APD, according to an example.

FIG. 2 is a block diagram of the device 100, illustrating additional details related to execution of processing tasks on the APD 116, according to an example. The processor 102 maintains, in system memory 104, one or more control logic modules for execution by the processor 102. The control logic modules include an operating system 120, a driver 122, and applications 126, and may optionally include other modules not shown. These control logic modules control various aspects of the operation of the processor 102 and the APD 116. For example, the operating system 120 directly communicates with hardware and provides an interface to the hardware for other software executing on the processor 102. The driver 122 controls operation of the APD 116 by, for example, providing an application programming interface ("API") to software (e.g., applications 126) executing on the processor 102 to access various functionality of the APD 116. The driver 122 also includes a just-in-time compiler that compiles shader code into shader programs for execution by processing components (such as the SIMD units 138 discussed in further detail below) of the APD 116.

The APD 116 executes commands and programs for selected functions, such as graphics operations and non-graphics operations, which may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102 or that are not part of the "normal" information flow of a graphics processing pipeline, or that are completely unrelated to graphics operations (sometimes referred to as "GPGPU" or "general purpose graphics processing unit").

The APD 116 includes compute units 132 (which may collectively be referred to herein as "programmable processing units") that include one or more SIMD units 138 that are configured to perform operations in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by individual lanes, predication of lanes corresponding to control flow paths not currently being executed, and serial execution of different control flow paths, allows for arbitrary control flow to be followed.

The basic unit of execution in compute units 132 is a work-item. Each work-item represents a single instantiation of a shader program that is to be executed in parallel in a particular lane of a wavefront. Work-items can be executed simultaneously as a "wavefront" on a single SIMD unit 138. Multiple wavefronts may be included in a "work group," which includes a collection of work-items designated to execute the same program. A work group can be executed by executing each of the wavefronts that make up the work group. The wavefronts may be executed sequentially on a single SIMD unit 138 or partially or fully in parallel on different SIMD units 138. Wavefronts can be thought of as instances of parallel execution of a shader program, where each wavefront includes multiple work-items that execute simultaneously on a single SIMD unit 138 in line with the SIMD paradigm (e.g., one instruction control unit executing the same stream of instructions with multiple data). A command processor 137 is present in the compute units 132 and launches wavefronts based on work (e.g., execution tasks) that is waiting to be completed. A command processor 136 is configured to perform operations related to scheduling various wavefronts on different compute units 132 and SIMD units 138.

The parallelism afforded by the compute units 132 is suitable for graphics related operations such as pixel value calculations, vertex transformations, tessellation, geometry shading operations, and other graphics operations. A graphics processing pipeline 134 which accepts graphics processing commands from the processor 102 thus provides computation tasks to the compute units 132 for execution in parallel.

The compute units 132 are also used to perform computation tasks not related to graphics or not performed as part of the "normal" operation of a graphics processing pipeline 134 (e.g., custom operations performed to supplement processing performed for operation of the graphics processing pipeline 134). An application 126 or other software executing on the processor 102 transmits programs (often referred to as "compute shader programs," which may be compiled by the driver 122) that define such computation tasks to the APD 116 for execution. Although the APD 116 is illustrated with a graphics processing pipeline 134, the teachings of the present disclosure are also applicable for an APD 116 without a graphics processing pipeline 134. Various entities of the APD 116, such as the compute units 132, can make accesses to the last level cache 110.

It is desirable to understand what memory accesses are occurring at a fine-grained level and in real time. Computer systems often provide some degree of visibility into what memory accesses are occurring and when. However, such visibility is usually limited, such as by providing only an overall count of memory accesses during a long time period. Fine-grained access information, indicating which addresses memory accesses are directed to, and what times such memory accesses are made, are usually not provided by the hardware. Such information can be very useful. For example, fine-grained memory access information can allow an application developer to identify memory access bottlenecks in an application at a very fine-grained level (e.g., to understand which accesses, made at which times, are problematic), which can allow the application developer to improve application performance by adjusting aspects of operation such as ordering of memory accesses, grouping of memory accesses, or the like. In another example, fine-grained memory access information can be provided to a runtime performance analyzer (e.g., a dynamic performance controller 404 of FIG. 4) that can adjust execution settings based on the memory accesses.

A logger 202 is illustrated in FIG. 2. Although illustrated as part of the APD 116, it should be understood that, in alternative examples, the logger 202 is not part of the APD 116 and is communicatively coupled to the APD 116. The logger 202 is configured to log information that is then used by a dynamic performance controller 404 (FIG. 4) to adjust performance settings of the device 100.

The logger 202 is configured to store performance event information into a performance log and to store memory access event information into a memory access log. The performance events include events that may or may not be directly related to memory accesses. Performance events may indicate a variety of aspects of performance, such as processing throughput, processing latency, memory access performance (e.g., amount of data successfully accessed in a given amount of time), or other aspects. In general, the performance events indicate how well the computing device 100 is performing in a given time period, and any of a variety of measures for such performance may be used. The memory access events include events such as writes to memory and reads from memory. The memory access event information indicates, either implicitly or explicitly, memory addresses associated with the memory accesses. In other words, the memory access logs store indications of what memory accesses are performed as well as what memory addresses the memory accesses are directed to. The memory address information is provided at a certain level of granularity that is not necessarily the exact address. In some examples, the memory address specifies a large chunk of memory—a memory address range—in which the memory accesses are performed, but does not provide more specific information than that. Both the performance event information and the memory access event information include or are associated with time periods or other ordering information that indicates the "time" for the associated performance events or memory access events. In some instances herein, this "time" is referred to as an epoch. In addition, the performance event information for a certain time includes memory access event references that point to associated memory access event information for that same time. These memory access event references allow correlation of performance events with memory access events, for example, during subsequent analysis or use of the performance event information and memory access event information.

As stated above, the performance event information for a certain time period includes references to memory access event information for the same time period. These references allow subsequent processing to correlate performance events with memory accesses. Performance events may indicate a variety of aspects of performance, such as processing throughput, processing latency, memory access performance (e.g., amount of data successfully accessed in a given amount of time), or other aspects. In general, the performance events indicate how well the computing device 100 is performing in a given time period, and any of a variety of measures for such performance may be used. Associating such performance events with memory access events allows subsequent analysis to first detect a performance level of interest (e.g., a drop in performance) and then to determine which memory accesses occur at that time period, and which addresses are associated with such memory accesses. In some examples, this determination allows the analysis to determine that the way in which certain memory accesses that are performed results in a particular drop in performance, or more generally to determine that some aspect of the memory accesses themselves or of processing related to the memory accesses results in, results from, or is otherwise associated with a particular drop in performance.

The logger 202 is capable of recording which memory addresses the various memory accesses are targeting. In some examples, the address resolution for which such tracking occurs is variable by the logger 202, either automatically or at the request of a different unit. The address resolution refers to the size of the memory access range for which the logger 202 stores individual items of memory access information. For example, with a 256 byte address resolution, the logger 202 stores items of memory access information for accesses within 256 byte address ranges. In an example, for a first "time," the logger 202 detects memory accesses to addresses within a first 256 byte range and records such memory accesses as the memory access event information for the first time and for the first 256 bytes. The logger 202 thus stores information indicating that the detected number of memory accesses has occurred during the first time. No information is stored indicating which memory addresses within that 256 byte range the memory accesses occurred to. As can be seen, the address resolution indicates the specificity with which memory access events are recorded.

The logger 202 records performance events on a per time basis and records memory access events on a per time basis as well. In some examples, the logger 202 records a single performance event entry for a given time and records multiple memory access event entries for a given time. Each performance event entry stores performance event information for a particular time. Each memory access event entry stores memory access event information for a particular combination of time and memory address range. In other words, in such examples, the logger 202 stores, for each time, one item of performance event information and multiple items of memory access event information, where each item of memory access event information is for a different memory address range. Each item of performance event information includes a set of performance events for a time and for multiple memory address ranges and each item of memory access event information is associated with a time and a memory address range and includes indications of which memory accesses to that memory address range occur in the associated time. It should be understood that performance event information is not specific to any memory address range and thus covers multiple memory address ranges (or can be considered to cover the entire memory address space).

In some examples, the memory addresses tracked by the logger 202 are in a physical address space, as opposed to a virtual address space. A physical address space is the address space of the physical memory devices, whereas a virtual address space is the address space that is mapped to the physical address space and is thus independent from the physical addresses of the memory devices. Typically, an operating system and/or hardware (e.g., a memory controller) maintains information mapping virtual address spaces to physical address spaces. When applications or other software or hardware requests access to memory using a virtual address, the operating system and/or hardware translates such virtual addresses to physical addresses to access the memory.

The address range size for the memory access event information tracked by the logger 202 may or may not be the same as the virtual address memory page size. A virtual address memory page is a portion of contiguous addresses for which a memory address translation occurs. More specifically, typically, a virtual address has a portion (typically the most significant bits) that is considered the virtual memory page address. It is this portion that is translated to a physical address memory page. Obtaining a finer granularity physical address occurs by translating the virtual memory page address to a physical memory page address and then adding an offset. The offset is a portion of the virtual memory address other than the virtual memory page address. The size of the address range may be different from or the same as this virtual memory page size.

In some examples, it is advantageous to have the tracking address range size be smaller than or equal to the virtual memory page size. This is because if the tracking address range size were larger than the virtual memory page size, then it would be possible to track in any particular item of memory access event information, information from multiple unrelated virtual memory pages, which may not be desirable. That is, tracking information from multiple unrelated virtual memory pages could result in an inability to discriminate between virtual memory pages for the aggregate states tracked in a single item of memory address tracking information. Thus, in some examples, the logger 202 limits the memory address range size to equal to or smaller than the virtual memory address page size.

Above, it is stated that performance information and memory access event information is tracked for particular "times." The term "time" is defined broadly herein. Time does not necessarily refer to wall clock time or to chip clock time or some other similar measure, although in some examples, time does refer to one such measure. Alternatively, it is possible for "time" to be measured by relation to number of tracked events occurring. In an example, "time" advances when an event that is tracked occurs. For example, when a memory access occurs, time is incremented. In another example, time is advanced for each byte of memory that is accessed over a data fabric (connection between requestor and memory) or for each byte accessed in a memory. In yet another example, time is advanced where a reference clock is advanced. Thus, in this example, in any particular item of memory access event information, a certain number of memory access events is stored. In other words, in some examples, the logger 202 tracks a certain number of events. In another example, in any particular item of performance event information, a certain number of performance events is stored.

In some examples, each item of performance event information and each item of memory access event information corresponds to an "epoch." Each epoch ends when an epoch end event occurs. In some examples, an epoch end event occurs when an item of performance event information overflows or when an item of memory access event information overflows. In some examples, an overflow occurs when the storage available in an item of performance event information or in an item of memory access event information overflows. In some examples, an overflow occurs when sufficient data has been tracked such that the amount of storage available is zero or is insufficient to store more data, for at least one item of tracked data—in other words, where there is no space left in the storage to store additional data. In some examples, the storage that overflows can track any type of information. It should be understood that this storage is the storage that stores any of the data tracked by the logger. In some examples, storage overflows when a number of performance events or memory access events is equal to a maximum for any item in a given epoch. In other examples, storage overflows when a count for statistic information for an item of performance event information or for an item of memory access event information reaches a maximum value (e.g., for an 8-bit counter, reaches 255). In some examples, when an overflow occurs, a new epoch, with new items of performance event information and memory access information, is started. It should be understood that an item of memory access event information for a given address range in a given epoch can overflow before any other item of memory access event information for a different address range in the same epoch overflows. In that instance, a new epoch is started, both for the performance event information and for all items of memory access event information. In some examples, each item of performance event information includes one or more pointers to one or more items (or all items) of memory access event information in the same epoch as the item of performance event information. In some examples, a new epoch is not started and a new item of performance event information is created in the same epoch.

Figure 3:
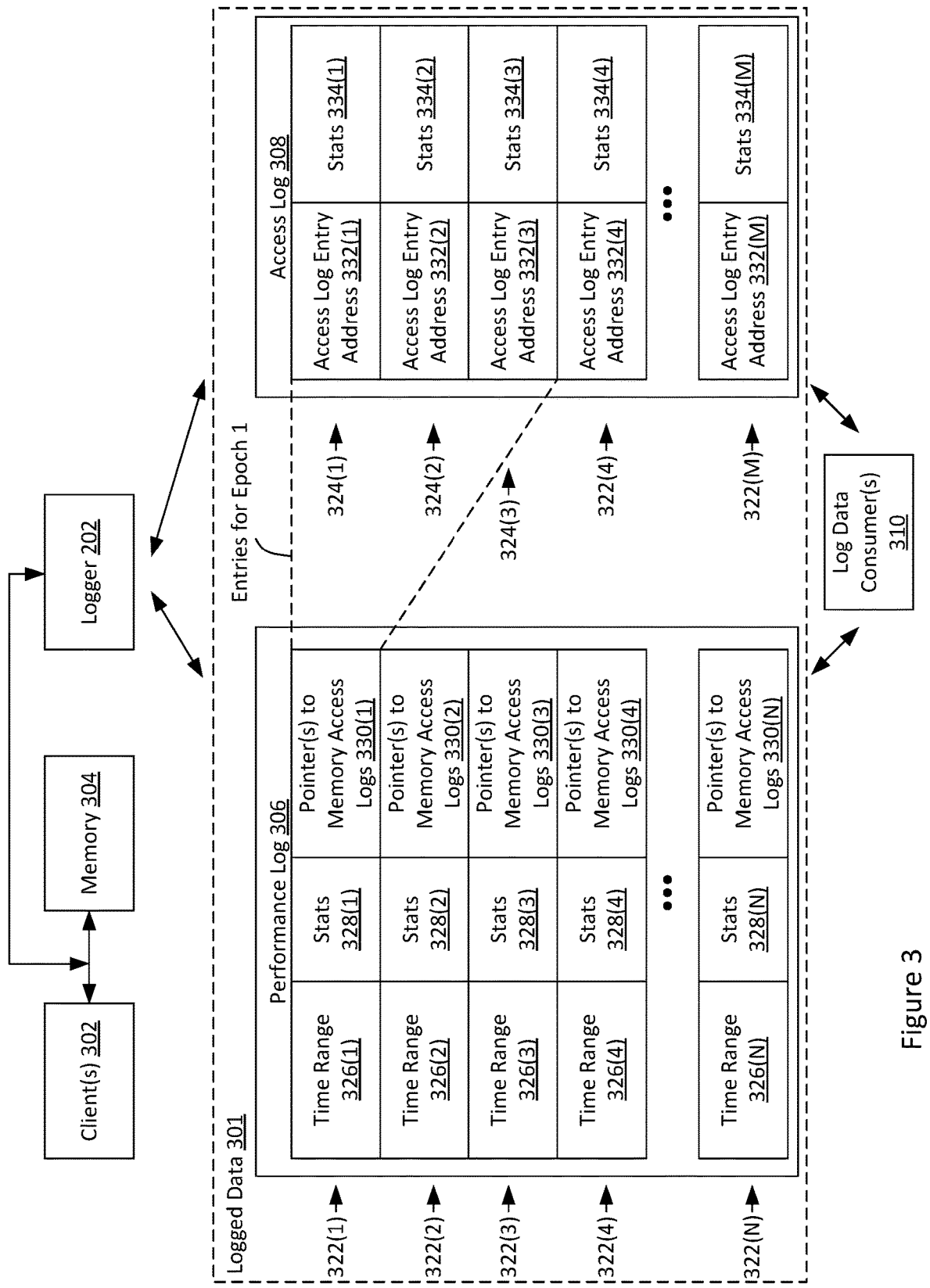
FIG. 3 illustrates example operations performed by a logger.

FIG. 3 illustrates example operations performed by the logger 202. The logger 202 interfaces with one of more clients 302 and one or more memories 304. Specifically, the logger 202 monitors performance events for the client(s) 302 and memory 304, monitors memory accesses from the clients 302 to the memory 304, and records such events in the performance log 306 and access log 308. The performance log 306 and access log 308 together store logged data 301. In some example, this logged data 301 is stored in one or more memories of the APD 116 and/or the device. Logged data 301 may also be stored at other locations. In an example, the logger 202 or other element stores at least some of the logged data 301 into a memory or storage that serves as a backing store (e.g., the "backup memory" described elsewhere herein) for the logged data 301. It should be understood that the memory 304 is any technically feasible memory, such as a cache or a memory, and such as a memory on the same chip as or on a different chip as the logger 202, the processor 102, or the APD 116. In some examples, a logger 202 exists for multiple memory elements of a memory hierarchy (i.e., for each cache, each memory, and the like). In some examples, a logger 202 tracks events for multiple memories (e.g., for one or more caches and/or for one or more memories or other entities). In some such examples, each memory access log entry stores stats for multiple memories/caches. In other such examples, each memory access log entry is devoted to a single memory or cache type and each such memory access log entry includes an indication of the associated memory type.

In some examples, the clients 302 are any unit of the device 100 that are capable of making memory access requests. In some examples, such units include the processor 102 and the APD 116, as well as any other unit capable of making memory access requests, such as an auxiliary processor 114 or IO device 17. In various examples, the logger 202 is embodied as hardware (e.g., circuitry configured to perform operations described herein), software executing on a processor, or a combination thereof. In some examples, the logger 202 is partially or fully implemented by the command processor 136. In some examples, the command processor 136 is a programmable processor that executes software that performs some or all of the functionality of the logger 202.

As the logger 202 monitors the performance events and memory access events, the logger 202 generates performance log entries 322 and memory access log entries 324. In some examples, the performance log entries 322 are the items of performance event information discussed above. In some examples, the memory access log entries 324 are the items of memory access event information described above. The logger 202 observes performance events and memory access events, extracts or generates information about such events, and writes such information into the performance log entries 322 and memory access log entries 324 as described elsewhere herein.

Each performance log entry 322 includes a time range 326, statistics 328, and one or more pointers to memory access logs 330. In some examples, the time range includes an indication of a reference clock that measures actual time (e.g., wall clock time) or that measures system clock time (e.g., number of cycles since an initial point) or that is based on system clock time for any clock of the device 100. Note that this time range 326 is not necessarily the same type of time as the time that defines which "epoch" an entry is within, as the epoch may be based on the ordering of performance events or memory access events. Storing the time range 326 explicitly in the performance log entry 322 provides the ability to link a particular epoch to an actual point in time.

The statistics 328 include information about the performance events that are tracked. Some example statistic information is for the given epoch (e.g., occurs within that epoch) and includes: the number of data fabric bytes written or read, for one or more memory types (e.g., cache, memory, or other memory type), the number of bytes written to, read from, and/or prefetched into each such memory type, the number of read instances and number of bytes involved in a compression read/modify/write operation, a number of compression metadata bytes read from or written to a memory, the number of burst writes or reads, the amount (e.g., percentage) of bandwidth used for one or more of memory, cache, or data fabric, power management events, and user-defined events which are definable by an entity such as software. Performance log entries 322 include one or more of these items of statistic information.

The number of data fabric bytes written or read includes the number of bytes written or read using a data fabric. A data fabric is the connection between clients 302 and memory 304. Data fabrics can have a capacity (e.g., bandwidth) independent of that of the memories or clients for which the data is written or read, and thus the ability to measure the number of bytes written or read can be useful to understand. The number of bytes read or written for one or more memory types is stored on a per memory type basis. In an example a number of bytes that are read from or written to a cache in an epoch is stored in the statistics for a particular entry 322 and the number of bytes that are read from or written to a memory in the same epoch is also stored in the statistics for that entry 322. In some examples, memory accesses are accessed to compressed data, where compression is a hardware supported operation. In some such examples, the logger 202 separately maintains the number of bytes read, written, or modified for compressed data and for uncompressed data. Thus, in some such examples, the statistics 328 for a particular entry 322 include a number of bytes read, written, or modified for uncompressed data within an epoch, and a number of bytes read, written, or modified for compressed data within the same epoch. In addition, compressed data can include or require additional metadata that specifies information required for compressing or decompressing the data or that is otherwise useful to the compression operation. In some examples, the statistics 328 store the amount of such metadata that is stored in the epoch. In some examples, memory accesses are of a burst type and a non-burst type. Generally, burst type accesses are accesses to relatively large amounts of data that is contiguous in the physical address space, whereas non-burst type accesses are accesses to individual items of data (e.g., individual words). In some examples, the statistics 328 separately store a count of burst-type accesses, in addition to a count of non-burst type accesses. The bandwidth information includes the percent (or other measure) of bandwidth capacity actually used for a memory or data fabric within the mentioned epoch.

For any given performance log entry 322 for a particular epoch, the pointers to access logs 330 include pointers to the access log entries 324 for that epoch. In some examples, a single performance log entry 322 for an epoch includes pointers to all access log entries 324 in the access log 308 for that same epoch. Each access log entry 324 includes an access log entry address 332 and access log statistics 334. The access log entry address 332 for an access log entry 324 specifies the address range of the statistics 334 for that access log entry 324. More specifically, the entire access log 308 has an address range size (the "address resolution" described above) which specifies the granularity with which memory accesses are tracked. This address range size also indicates the range of memory addresses after the access log entry address 332 that is tracked by an access log entry 324. In other words, each access log entry 324 tracks addresses between the access log entry address 332 and the access log entry address 332 added to the address range size. The stats 334 include information about the memory accesses tracked within the corresponding address range specified by the access log entry 332. It should be seen that a performance log entry 322 for an epoch includes statistics 328 about multiple different address ranges that occur within an epoch, and each such address range has a different access log entry 324, each of which includes statistics 334 about the memory accesses made to the address range within the epoch.

The statistics 334 include any combination of the following, all for the epoch and the memory address range of the access log entry 324: the number of bytes returned over the data fabric, the number of bytes written over the data fabric, the read compression ratio, the write compression ratio, the number of bytes written to or read from a memory (which such number can be stored independently for different types of memories, such as memory, caches, or other types of memories), the number of bytes prefetched into a memory, the number of bytes rinsed (where rinsing means writing dirty data back to a backing memory so that the data is no longer dirty), the number of reads caused by compression operations, the number of atomic memory operations performed, the cache policy (including, for example, whether allocations are allowed into the cache, where allocations occur when a miss occurs, in order to store missed data into the cache, re-reference interval prediction data, which indicates the amount of "time" between re-references of a cache line), user-defined data, or any other type of information that could be stored. The read compression ratio is the ratio of the size of compressed data to the size of uncompressed data for read operations and the write compression ratio is the ratio of the size of compressed data to the size of uncompressed data for write operations. The number of reads caused by compression operations includes how many reads to data actually occur due to a compression operation. For example, reading from compressed data or writing compressed data may require reading or writing of data other than the actual data compressed, and this other data can include compression metadata or other data of a compressed block (since data may be compressed together and thus operation on one portion of compressed data may require other operations on other data that is compressed together).

Log data consumers 310 are illustrated in FIG. 3 as well. These log data consumers 310 include one or more of a log data backup agent and/or a log data analyzer, either of which is embodied as hardware (e.g., circuitry), software executing on a processor, or a combination thereof. A log data backup agent stores the information from the performance log 306 and/or the access log 308 into one or more backup memories. In some examples, this storing does not, itself, trigger any logging. The one or more backup memories include one or more of the memory 104, memories within the APD 116, storage 108, or other memories. The log data backup agent transfers the data from the performance log 306 and/or access log 308 when either of those logs run out of room (e.g., when a new entry is to be created but there is no space left), or in response to any other technically feasible event. The log data analyzer analyzes the performance log 306 and/or access log 308. In some examples, the log data analyzer analyzes these logs to determine how to adjust the operation of the device 100 for better performance, and/or analyzes these logs to generate and provide conditioned information for consumption by another system or for a human (e.g., for a human developer developing an application who will use profiling data to improve performance of the application). In some examples, the log data analyzer is embodied as multiple parallel programs (such as compute shader programs executing on the APD 116). In some examples, the log data analyzer is or is part of the dynamic performance controller 404. For example, in some examples, the dynamic performance controller 404 includes both hardware (e.g, circuitry, a processor) as well as software executing on one or more processors such as the compute units 132 of the APD 116. The data in the performance log 306 and access log 308 is organized to facilitate efficient parallel processing of such data. In an example, one parallel execution item (e.g., a first compute shader work-item or wavefront) analyzes a first access log entry 324 during a time period in which a second parallel execution item analyzes a second access log entry 324. Both such parallel execution items produce a result for such analysis in parallel, which is used by a different execution item (such as a compute shader work-item or wavefront or even a thread on the processor 102). In some examples, a different parallel execution item analyzes the performance logs 322 in parallel with the first and second parallel execution item as well. In some examples, a parallel execution item analyzes a performance log entry 322, fetches the pointers 330, and spawns further parallel execution items to analyze the access log entries 324 pointed to by the pointers 330, along with information from the analysis of the performance log entries 322. In some examples, a single execution item processes information in or derived from multiple access log entries 324. In some examples, a single execution item processes information from different epochs. In some such examples, the single execution item aggregates information from different epochs, for example, by combining statistics for smaller address ranges and single epochs to generate statistics for larger address ranges and longer epochs. In some examples, an entity such as the dynamic performance controller 404 utilizes the information analyzed by the log data analyzer to adjust performance settings for the APD 116 and/or other parts of the device 100.

In some examples, the logger 202 filters information, preventing that information from being written to the performance log 306 and/or the access log 308. In some such examples, the logger 202 references data indicating the processes, virtual machines, or other entities for which logging is allowed and ignores (does not log for) accesses for which logging is not allowed. In an example, an application that has logging disabled makes memory accesses, but the logger 202 does not include information about such memory accesses in the performance log 306 and/or access log 308.

Figure 4:
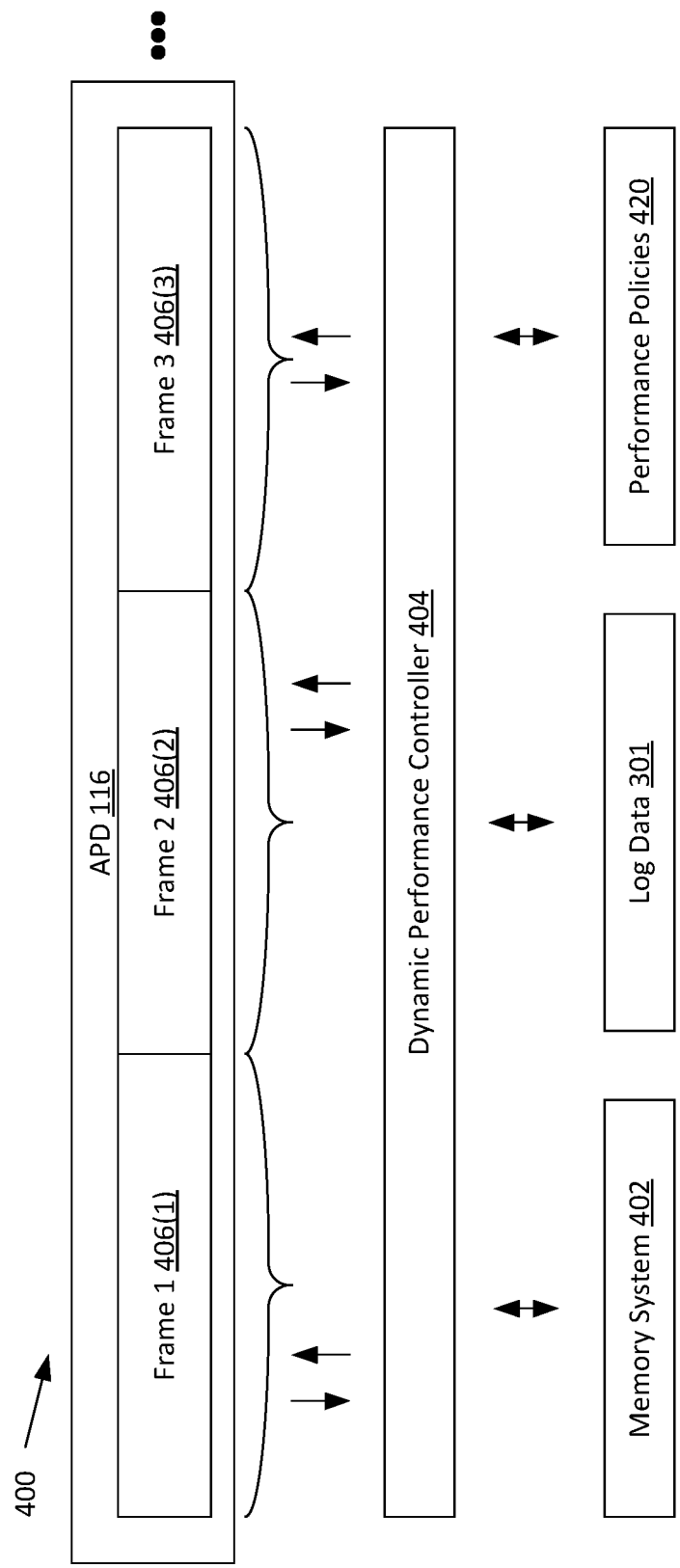
FIG. 4 illustrates a dynamic runtime policy system, according to an example.

FIG. 4 illustrates a dynamic runtime policy system 400, according to an example. The system 400 includes the APD 116, a memory system 402, and a dynamic performance controller 404. In operations described herein, the dynamic performance controller 404 refers to log data 301 and generates and refers to performance policies 420 (which include access data items 506—see FIG. 5). The performance policies 420 are stored in any technically feasible memory, such as memory of the dynamic performance controller 404 or any other memory of the device 100, either described herein or not described herein.

In some examples, the memory system 402 is or includes the last level cache 110 of FIG. 1. In other examples, the memory system 402 is or includes any other cache or memory that services memory access requests by the APD 116, such as any cache or memory within the APD 116 or external to the APD 116, or any combination thereof. In some examples, the dynamic performance controller 404 is a hardware circuit, software executing on a processor, or a combination thereof. In some examples, the dynamic performance controller 404 is included in the memory system 402 or is separate from the memory system 402. In some examples, the dynamic performance controller 404 is included in the APD 116 or is separate from the APD 116.

The APD 116 processes data for a series of frames 406. Each frame 406 is a full image rendered by the APD 116. To generate graphical data over time, the APD 116 renders a series of frame, each of which includes graphical objects for a particular instant in time.

To generate each frame 406, various components of the APD 116 access data stored in the memory system 402. Accessed data includes a wide variety of data types for rendering graphics, such as geometry data (e.g., vertex coordinates and attributes), texture data, pixel data, or a wide variety of other types of data. Aspects of performance depend in part on settings for the various elements of the memory system 402 (or for other components of the APD 116 or device 100). The performance controller 404 is capable of, and does, dynamically apply performance policies to operations of the APD 116 and/or the device 100 based on the log data 301. Applying these performance policies includes adjusting one or more of these settings.

Some example settings include cache settings. Some examples cache settings include a no allocation setting, streaming settings, and cache aging settings. A no allocation setting includes a setting that controls whether allocations into a cache are performed as the result of a miss. A cache allocation is an event that occurs in response to a memory access that results in a miss. A memory access results in a miss in the event that the data at the address requested by the access is not in a cache. In this event, if allocation is enabled, the cache fetches the line and allocates a cache line entry in the cache and places the fetched cache line into the cache line entry. If there is a valid cache line at that entry, then that cache line must be evicted, which results in additional work. The no allocation setting prevents allocation and thus eviction if set to "yes," and acts normally if set to "no."

Streaming settings include settings to control streaming cache fills into a cache. A streaming cache fill is a sequence of cache fills of cache lines in a contiguous address range. The settings control whether and/or how streaming occurs. Cache aging settings control how cache lines are aged. In an example, a replacement policy controls replacement of cache lines when a miss occurs. A cache controller looks for a cache line to evict based on the ages of the cache lines in a set. In an example, the cache line with the lowest age is selected for eviction. In addition, when new lines are entered into the cache, or when other events occur, the recorded age for one or more lines is adjusted. The setting for cache aging controls how to change the age for cache lines that are tracked, thus changing which cache lines are eventually selected for eviction in the event of a miss.

Other settings control aspects other than cache replacement policies, such as compression settings and queue priority settings. Compression settings include whether data is compressed in a cache and control how that data is compressed (e.g., compression mode). Queue priority settings control queue priority for a memory. A memory has multiple queues that queue requests from different clients. Generally, the memory fairly acts on the queues or prioritizes one or more queues to different degrees. Acting fairly on the queues means servicing the requests in those queues in a roughly equal manner, servicing a roughly equal number of requests from each queue. Prioritizing one or more queues means servicing more requests for higher priority queues than for lower priority queues, per unit of time. Controlling these aspects means adjusting the priorities, thus adjusting the priority with which the requests of different queues are serviced. Clients to a memory can be any entity of the device 100 that can access memory.

Applying a performance policy based on the log data 301 means that the dynamic performance controller 404 adjusts one or more performance settings in response to a change in one or more of the log data 301. In various examples, any of the items of log data 301 described above (e.g., any of the described statistics 328 or statistics 334) can be the basis for such modifications to adjustment in one or more performance settings. In an example, the dynamic performance controller 404 adjusts any one or more of cache settings or memory settings as described elsewhere herein based on one or more of the number of data fabric bytes written or read, for one or more memory types (e.g., cache, memory, or other memory type), the number of bytes written to, read from, and/or prefetched into each such memory type, the number of read instances and number of bytes involved in a compression read/modify/write operation, a number of compression metadata bytes read from or written to a memory, the number of burst writes or reads, the amount (e.g., percentage) of bandwidth used for one or more of memory, cache, or data fabric, power management events, and user-defined events which are definable by an entity such as software, the number of bytes returned over the data fabric, the number of bytes written over the data fabric, the read compression ratio, the write compression ratio, the number of bytes written to or read from a memory (which such number can be stored independently for different types of memories, such as memory, caches, or other types of memories), the number of bytes prefetched into a memory, the number of bytes rinsed (where rinsing means writing dirty data back to a backing memory so that the data is no longer dirty), the number of reads caused by compression operations, the number of atomic memory operations performed, the cache policy (including, for example, whether allocations are allowed into the cache, where allocations occur when a miss occurs, in order to store missed data into the cache, re-reference interval prediction data, which indicates the amount of "time" between re-references of a cache line), user-defined data, or any other type of information that could be stored in the log data 301. In summary, the present disclosure contemplates a dynamic performance controller 404 that modifies one or more of the performance settings described herein based on one or more of the items of information in the log data 301. More specifically, the present disclosure contemplates a variety of implementations of the dynamic performance controller 404, where each such implementation is defined by a different combination of the log data 301 information described herein and the performance setting adjustment described herein, where the performance setting adjustment is made as a result of the log data information.

In some examples, the dynamic performance controller 404 applies performance policies for a given frame 406 based on the log data 301 derived from operations for one or more previous frames. More specifically, patterns of memory accesses are generally very similar from frame to frame. Therefore, it is possible to make observations about operations such as memory accesses in one frame and to use those observations to control the performance policies for subsequent frames. In other words, in some examples, based on observations made about particular performance events or memory accesses in a particular frame, the dynamic performance controller 404 controls the performance policies for the same memory accesses in one or more subsequent frames. Memory accesses are considered "the same" from frame to frame if the memory accesses occur in approximately the same place in an order of memory accesses of a frame. More specifically, in general, time-adjacent frames render very similar graphical information and thus have a very similar pattern of memory accesses. The term "approximately" allows for the possibility that some memory accesses that occur in one frame may not occur in another frame, since the frames can be somewhat different, meaning that the order of memory accesses between frames will not be identical.

An example of a manner in which the dynamic performance controller 404 controls performance policies in response to log data 301 is now provided. In this example, the dynamic performance controller 404 controls, in response to the log data 301, a cache access policy that controls three aspects: the age at which a new cache line is brought into the cache (e.g., as the result of a miss), the manner in which ages of the cache lines are updated when a miss occurs (e.g., how cache lines other than the accessed cache line are aged), and the age that a cache line is updated to when a hit occurs for the cache line (e.g., what age is the cache line set to when it is accessed).

It should be noted that the age referred to is an age in a least recently used cache replacement policy. More specifically, in such a policy, a cache is a set-associative cache that includes a number of sets each having a plurality of ways. Any given cache line is mapped to at least one set and can be placed into any way in that set, but cannot be placed in any set that the cache line is not mapped to. A cache line is defined as a portion of the memory address space. In an example, each cache line has a cache line address which includes a certain number of the most significant bits of the address, such that the remaining least significant bits specify an offset in that cache line. Typically, though not necessarily, a cache line is the minimum unit of data read into or written back from the cache. When a cache line is to be brought into a set of the cache and there are no free ways for the cache line, the cache evicts one of the cache lines in the set. The replacement algorithm selects the oldest cache line as the cache line to evict based on the ages of the cache lines in that set. The cache also places the new cache line into the cache with a "starting age." In the event of a hit, the cache updates the age of the cache line for which the hit occurred based on the memory access policy. Additional details are provided elsewhere herein.

As described above, the log data 301 includes information about memory accesses made to particular memory address ranges and at particular "times."

In one example, the dynamic performance controller 404 determines the re-reference interval and the re-reference intensity for the accesses corresponding to the data in the log data 301. Then, the dynamic performance controller 404 determines a policy according to the re-reference interval and re-reference intensity for the accesses corresponding to the information in the log data 301 that is analyzed. In some examples, the dynamic performance controller 404 determines the policy based on the re-reference interval and re-reference intensity from multiple frames. In some examples, the dynamic performance controller 404 remembers this policy for use in the subsequent frame.

Figure 5:
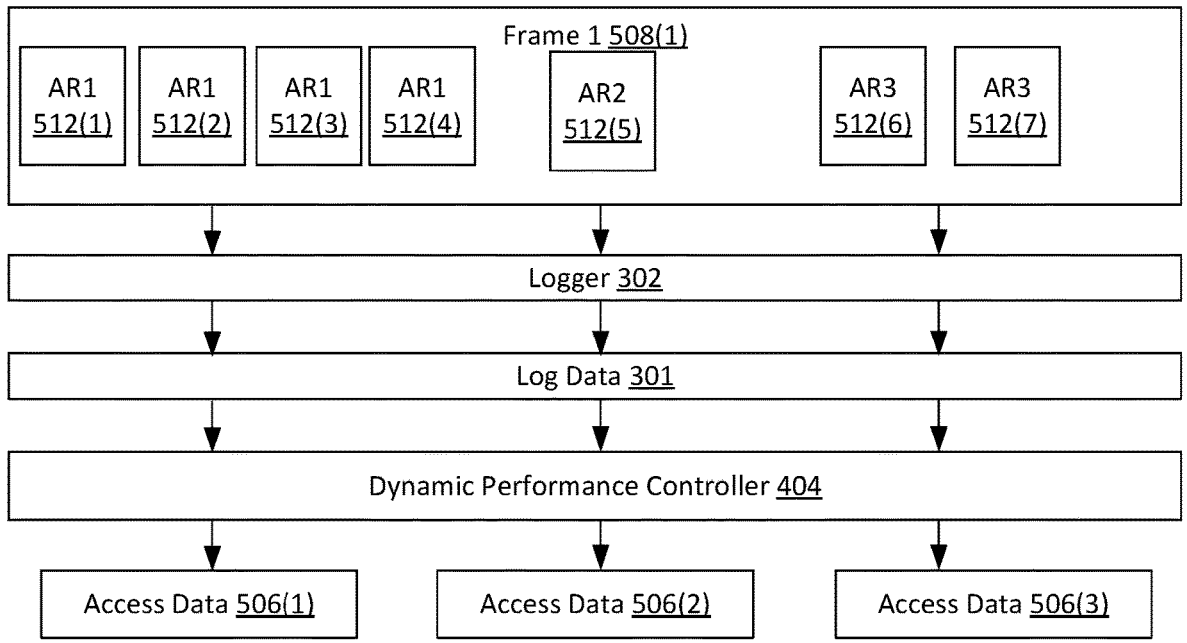
FIG. 5 illustrates operations for recording access data patterns, according to an example.

FIG. 5 illustrates operations for recording access data patterns 506, according to an example. FIG. 5 illustrates a single frame—frame 1 508(1) in which a number of accesses 512 are occurring. In this example, a first set of accesses—accesses 512(1) to 512(4) are to a first address range AR1 and occur within a certain time period. The logger 202 identifies the three sets of accesses 512 and generates information for the log data 301. The dynamic performance controller 404 generates access data items 506 based on the log data 301, where the access data items 506 correspond to each of the sets of accesses 512. As described above, the log data 301 includes one or both of the performance log entries 322 and/or the memory access log entries 324 described with respect to FIG. 3. The access data items 506 include information regarding how to "condition" subsequent memory accesses. In other words, the dynamic performance controller 404 makes a determination based on the log data 301 regarding how to "condition" subsequent data accesses in subsequent frames. The dynamic performance controller 404 records such determinations as the access data items 506.

Figure 6:
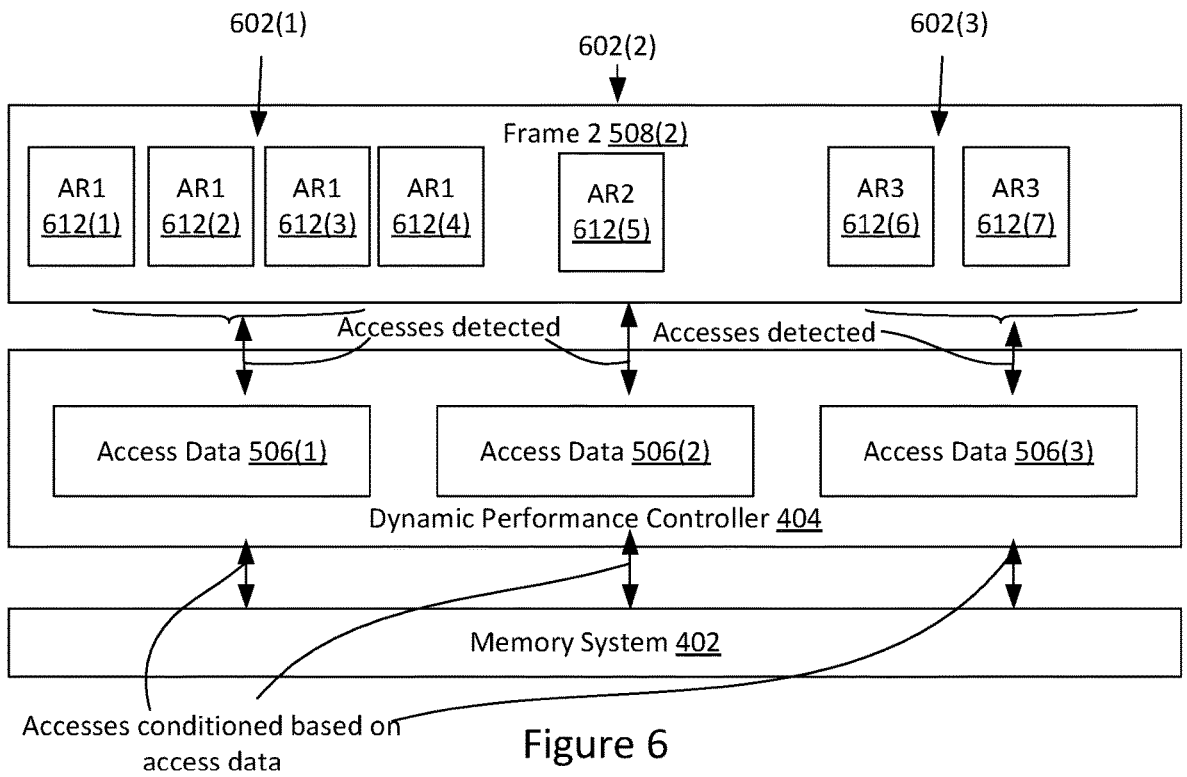
FIG. 6 illustrates example usage of the access data items, according to an example.

FIG. 6 illustrates example usage of the access data items 506, according to an example. The dynamic performance controller 404 examines the access data items 506 and "conditions" accesses made in frames subsequent to the frame(s) in which the access data items 506 are recorded. "Conditioning" memory accesses means setting parameters for the memory accesses, where the parameters correspond to the determined re-reference interval values and the determined re-reference intensity values. For example, in a first frame, the dynamic performance controller 404 records a first access data item 506 for a set of memory accesses that access the same page. The first access data item 506 indicates a certain policy for that set of memory accesses. In a subsequent frame, the dynamic performance controller 404 identifies the same accesses (that is, the accesses of the first access data item 506) and "conditions" those accesses according to the policy stored in the first access data item 506. More specifically, the dynamic performance controller 404 configures those accesses to use the policy that corresponds to the first access data item 506. Such a policy indicates that these accesses in the subsequent frame should be made according to a certain set of settings. In some examples, the policy indicates the following: how to age cache lines other than the accessed cache line and in the same set as the cache line, in the event of a miss; what age to insert a new cache line into the cache line; and what age to set a cache line to when a hit occurs.

Aging cache lines in the event of a miss is now described. When a miss occurs in a cache, the cache identifies the cache line to bring into the cache. The cache also determines which set the identified cache line is to be brought in to. If any cache line in that set has an age that is equal to or greater than a threshold (e.g., 3 if the age counter is two bits), then the cache selects that cache line for eviction. If no cache lines have an age that is higher than a threshold, then the cache ages the cache lines of the set. The setting of how cache lines are aged in the event of a miss indicates which cache lines of a set are aged in the event that a miss occurs in that set and no cache line has an age that is equal to or greater than a threshold. In some examples, this setting indicates, by age, which cache lines will be aged in the event of a miss. In other words, the setting indicates the ages of cache lines that will be aged in the event of a miss. In an example of the setting, the setting indicates that cache lines of all ages lower than the above threshold (the "eviction threshold") are aged. In another example, the setting indicates that cache lines having ages above an age trigger threshold, which can be lower than the eviction threshold, are aged. In this situation, cache lines with ages lower than or equal to the low threshold are not aged in the event of a miss. In sum, in some examples, the re-reference interval and re-reference intensity of a set of memory accesses for one frame indicates how to age cache lines (specifically, the ages of cache lines that will be aged) in the event of a miss for the set of memory accesses in a subsequent frame.

The setting of what age to insert a new cache line into the cache is now described. When a cache line is brought into the cache as the result of a miss, the cache line is initially given a particular age. In some examples, this "starting" age is the lowest possible age, some intermediate age that is above the lowest possible age, or the maximum age. Again, this setting is dependent on the memory accesses reflected in an access data item 506. Thus, the access data item 506, corresponding to a memory page, indicates the starting age for a cache line in the event that a miss occurs and the cache line is copied into the cache.

What age to set a new cache line to when a hit occurs is now described. When a hit occurs to a cache line, the cache updates the age of that cache line (e.g., to indicate that the cache line is "newer"). In some examples, this setting indicates that the cache line is to have a particular age (such as 0) when a hit occurs for that cache line. In other examples, the setting indicates that the cache line is to have a different age such as 1, 2, or 3 (for a two bit age counter) in the event of a hit. In other examples, this setting indicates that the age of a cache line is to be modified in a particular manner, such as by decrementing the age by a number like 1. In sum, the access data item 506, corresponding to a memory page, indicates how the age of a cache line is modified when a hit occurs for that cache line.

It should be understood that conditioning a particular cache access according to a policy means causing the cache access to occur with that policy. For the insertion age policy, this policy is applied for an access conditioned according to that policy if that access results in a miss. The cache line that is to be brought in is brought in according to the age specified by the policy. For the aging policy, this occurs for the access conditioned according to the policy in the event that that access results in a miss. In this situation, the aging policy causes the other cache lines for the same set to be aged as specified by the policy. For the policy that defines what age a cache line will be set to in the event of a hit, when an access occurs that is conditioned according to a policy, and that access results in a hit, the policy causes the age of the cache line targeted by the access to be set according to the policy.

In FIG. 6, three sets 602 of data accesses 612 are illustrated. The dynamic performance controller 404 conditions these accesses according to the access data items 506 created in frame 1 508(1) of FIG. 5. For the data accesses 612 of the first set 602, the dynamic cache policy controller 304 identifies the first access data item 506(1). This access data item 506 indicates a certain manner in which to condition the accesses 612 of the set 602(1). As described elsewhere herein, the access data item 506 indicates a policy, which, in an example, indicates one or more of how to age cache lines when a miss occurs, what age to set new cache lines to, and what age to set cache lines to in the event of a hit. Additionally, this policy is dependent on the data recorded in frame 1 508(1) about the same accesses from that frame. The dynamic cache policy controller 304 causes the policy applied to the accesses of a given set 602 to be applied based on the recorded access data item 506 for the same accesses in a previous frame. Similar activity is applied for set 602(2) and set 602(3).

In some examples, the dynamic performance controller 404 determines which accesses in a particular frame are "the same as" accesses in a previous frame in the following manner. In each frame, memory accesses occur in a particular sequence. This sequence is mostly repeated from frame to frame. Thus, the dynamic cache policy controller 304 tracks the sequence of memory accesses to identify which accesses are "the same" from frame to frame. It is true that some accesses may differ from frame to frame, so the dynamic cache policy controller 304 accounts for such differences. For example, the dynamic cache policy controller 304 may notice omitted accesses, added accesses, or other modifications, and account for those. In some examples, memory accesses that occur to the same page and at the same "time" in different frames are considered to be "the same" memory accesses. In examples, the "time" is defined based on access order. For example, the first through one hundredth accesses are in a first "time," the one hundred first through two hundredth are in a second "time," and so on. In some examples, the time represents the time range 326 information stored in the log data 301. In some examples, the dynamic performance controller 404 determines that accesses occur at the same time in two different frames by applying a start-of-frame adjustment to the time range 326 of the memory accesses. For example, by subtracting the time of the start of the frame from the time for a given access from that frame, the dynamic performance controller 404 obtains the time within that frame associated with the accesses. Thus, the dynamic performance controller 404 is able to equate accesses from different frames to each other. In an additional example, the dynamic performance controller 404 considers the order of accesses and also applies a fudge factor sliding window that allows for memory accesses that occur at somewhat different times in different frames to be considered the same, accounting for the fact that operations in different frames may not take the exact same amount of time. The dynamic performance controller 404 also considers the addresses accessed. If the addresses are the same and are the same and the times are also considered the same, then the dynamic performance controller 404 considers the accesses to be the same accesses in different frames. If either the addresses are not the same or the times are not considered the same, then the dynamic performance controller 404 considers the accesses to not be the same accesses in different frames. Any other technically feasible means for determining the time is possible.

It should be understood that the manner in which accesses are "conditioned" is based on the access data items 506 recorded in a previous frame. Thus, for one particular access data item 506, which indicates a particular combination of re-reference interval and re-reference intensity, corresponding accesses are made with a first set of parameters including manner of aging cache lines, age to insert new cache lines, and age to update hit cache lines. For another particular access data item 506, which indicates a different combination of re-reference interval and re-reference intensity, corresponding accesses are made with a second set of parameters including manner of aging cache lines, age to insert new cache lines, and age to update hit cache lines. At least one of the parameters of the second set is different from at least one of the parameters of the first set.

Figure 7:
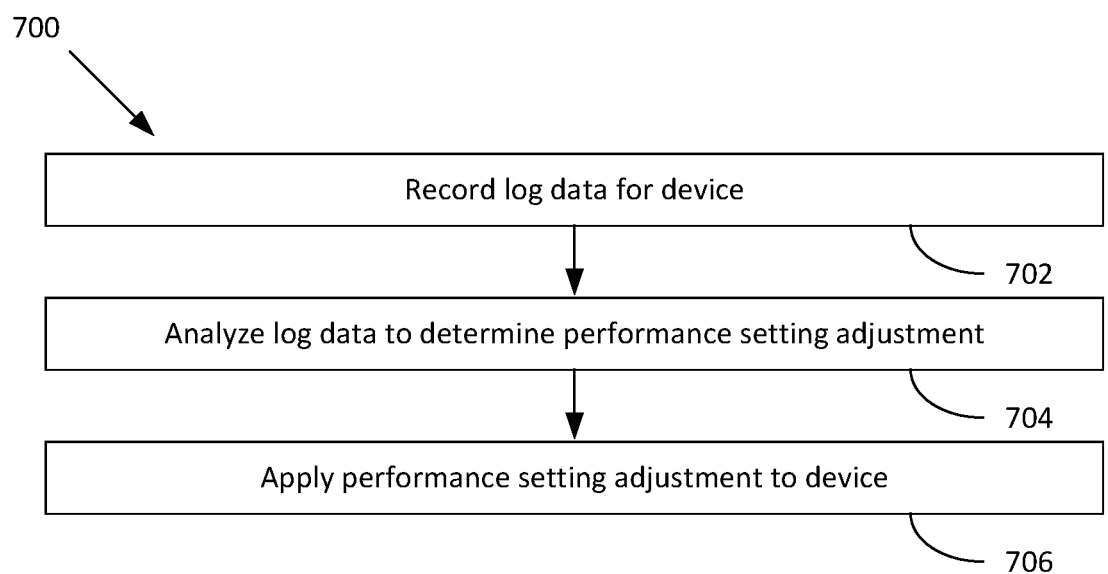
FIG. 7 is a flow diagram of a method for managing memory accesses, according to an example.

FIG. 7 is a flow diagram of a method 700 for managing performance settings in accordance with logged data, according to an example. Although described with respect to the system of FIGS. 1-6, those of skill in the art will understand that any system, configured to perform the steps of the method 700 in any technically feasible order, falls within the scope of the present disclosure.

At step 702, the logger 202 records log data 301 for the device 100. This recording occurs as described elsewhere herein. For example, the logger 202 records any of the information described above, including the statistics 328 for the performance log 306 and the statistics 334 for the access log 308. The logger 202 also records times for this information, again as described elsewhere herein, such as in the time range 326.

At step 704, a dynamic performance controller 404 analyzes the log data 301 to determine performance setting adjustments. As described elsewhere herein, the present disclosure contemplates a variety of implementations of the dynamic performance controller 404 that considers any combination of the information stored in the log data 301 to make adjustments to a variety of settings as described elsewhere herein.

At step 706, the dynamic performance controller 404 applies the performance setting adjustments to operation of the device 100. In an example, the dynamic performance controller 404 conditions memory accesses according to the performance setting adjustments, which causes the memory accesses to be performed according to those performance settings adjustments.

In some examples, the performance settings applied in step 706 are applied to a frame that is subsequent to the frame in which the log data 301 is recorded at step 702. In other words, in some examples, the dynamic performance controller 404 analyzes log data 301 obtained at one frame to generate performance settings adjustments to apply to a subsequent frame. In some examples, the dynamic performance controller 404 applies settings adjustments determined for memory accesses at a particular time in one frame to the "same" memory accesses applied at approximately the same time in a subsequent frame. In some examples, memory accesses are the same in different frames if the memory accesses are to the same addresses and occur at approximately the same time from the beginning of the frame. As described elsewhere herein, memory accesses occur at approximately the same time if the recorded time for the memory accesses minus the frame start time for the frame in which those accesses were made is approximately the same. In some examples, being approximately the same means being the same to within a threshold (e.g., an absolute threshold or a percentage threshold).

The elements in the figures are embodied as, where appropriate, software executing on a processor, a fixed-function processor, a programmable processor, or a combination thereof. The processor 102, last level cache 110, interconnect 112, memory 104, storage 108, various auxiliary devices 106, APD 116 and elements thereof, logger 202, clients 302, and the dynamic performance controller 404, include at least some hardware circuitry and, in some implementations, include software executing on a processor within that component or within another component.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for operating a device, the method comprising:
    recording log data for the device, wherein the recording occurs in a first graphics frame;
    analyzing the log data to determine one or more performance settings adjustments to apply to the device; and
    applying the one or more performance settings adjustments to the device, wherein the applying occurs for operations of a second frame, wherein the second frame is subsequent to the first frame.

2. The method of claim 1, wherein the operations of the second frame comprise memory accesses that occur within a threshold amount of time in the second frame as memory accesses for which the log data is recorded occur in the first frame.

3. The method of claim 1, wherein the log data includes one or both of time range data and statistics data.

4. The method of claim 2, wherein the log data comprise one or both of performance statistics and memory access statistics.

5. The method of claim 1, wherein the one or more performance settings comprise one or more of cache settings and memory settings.

6. The method of claim 1, wherein the one or more performance settings comprise one or more of a no allocation setting, a streaming setting, a cache aging setting, a compression setting, and a queue priority setting.

7. The method of claim 1, wherein analyzing the log data to determine one or more performance settings to apply to the device comprises determining that the one or more performance settings should change in response to a change in the log data.

8. The method of claim 1, wherein performance log entries of the log data include references to memory access log entries.

9. A system, comprising:
    a processor;
    a cache; and
    circuitry configured to:
        record log data for the system, wherein the recording occurs in a first graphics frame;
        analyze the log data to determine one or more performance settings adjustments to apply to the system; and
        apply the one or more performance settings to the system, wherein the applying occurs for operations of a second frame, wherein the second frame is subsequent to the first frame.

10. The system of claim 9, wherein the operations of the second frame comprise memory accesses that occur within a threshold amount of time in the second frame as memory accesses for which the log data is recorded occur in the first frame.

11. The system of claim 9, wherein the log data includes one or both of time range data and statistics data.

12. The system of claim 10, wherein the log data comprise one or both of performance statistics and memory access statistics.

13. The system of claim 9, wherein the one or more performance settings comprise one or more of cache settings and memory settings.

14. The system of claim 9, wherein the one or more performance settings comprise one or more of a no allocation setting, a streaming setting, a cache aging setting, a compression setting, and a queue priority setting.

15. The system of claim 9, wherein analyzing the log data to determine one or more performance settings to apply to the system comprises determining that the one or more performance settings should change in response to a change in the log data.

16. The system of claim 9, wherein performance log entries of the log data include references to memory access log entries.

17. A non-transitory computer-readable medium storing instructions that, when executed by a processor, cause the processor to perform operations comprising:
    recording log data for a device, wherein the recording occurs in a first graphics frame;
    analyzing the log data to determine one or more performance settings adjustments to apply to the device; and
    applying the one or more performance settings adjustments to the device, wherein the applying occurs for operations of a second frame, wherein the second frame is subsequent to the first frame.

18. The non-transitory computer-readable medium of claim 17, wherein the operations of the second frame comprise memory accesses that occur within a threshold amount of time in the second frame as memory accesses for which the log data is recorded occur in the first frame.

19. The non-transitory computer-readable medium of claim 17, wherein the log data includes one or both of time range data and statistics data.

20. The non-transitory computer-readable medium of claim 19, wherein the log data comprise one or both of performance statistics and memory access statistics.

* * * * *